INVENTORS
WILLIAM CHU
GUY RUDOLF

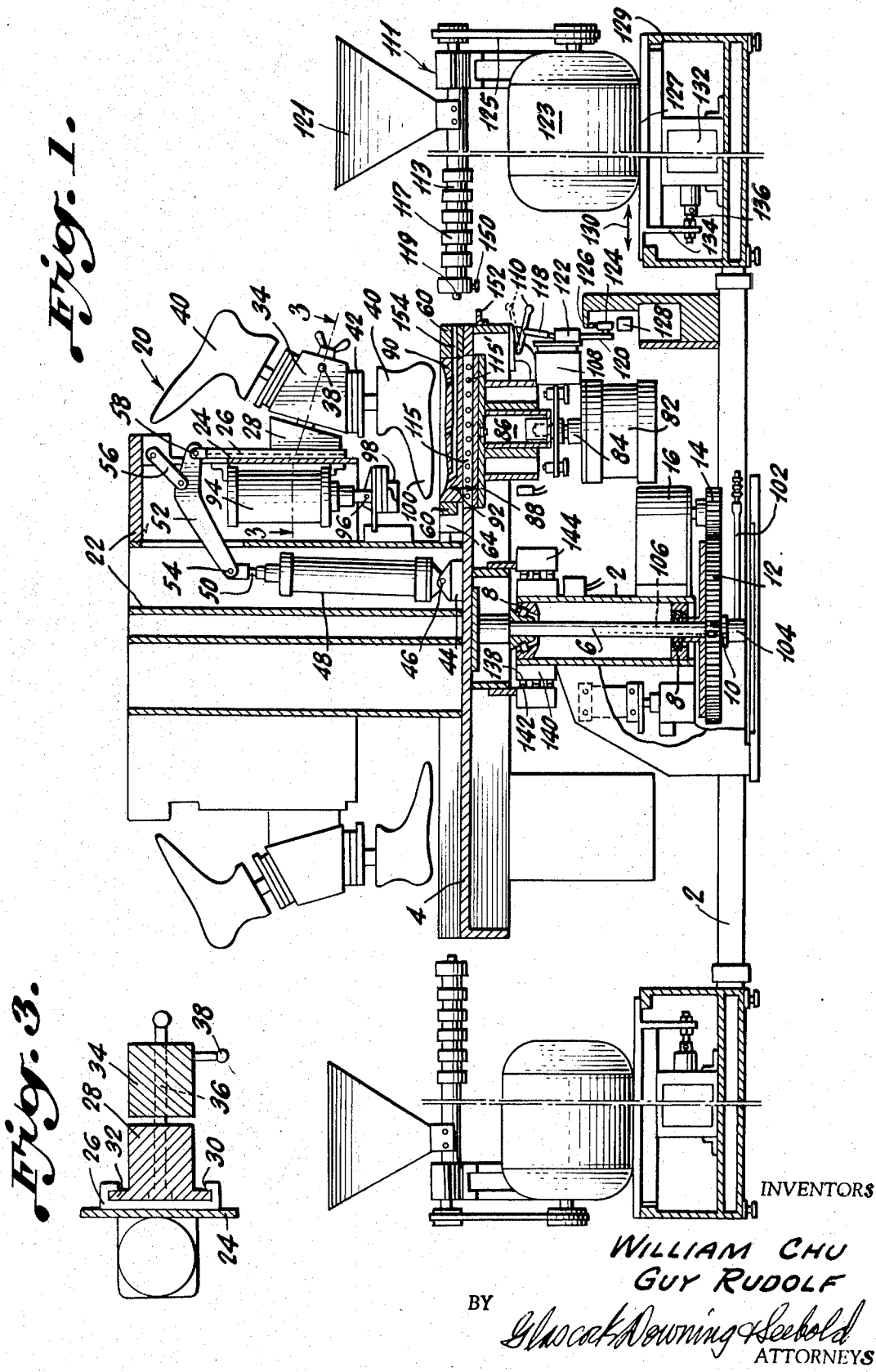

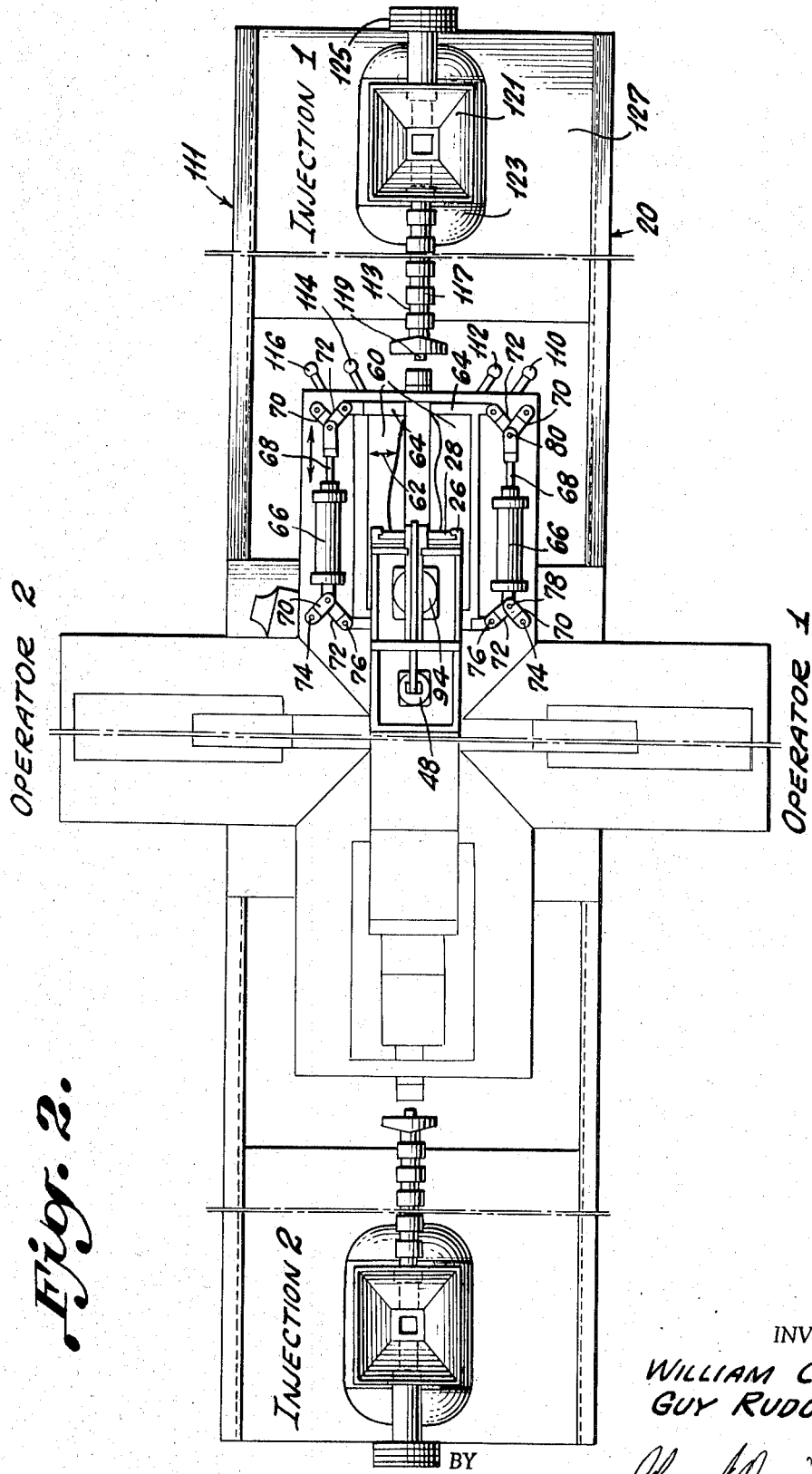

United States Patent Office 3,555,609
Patented Jan. 19, 1971

3,555,609
INJECTION MOLDING APPARATUS
William Chu, Cooksville, Ontario, Canada, and Guy Rudolf, Vernon, France, assignors to Bata Shoe Company, Inc., Belcamp, Md.
Filed Oct. 31, 1967, Ser. No. 679,495
Int. Cl. B29f 1/00
U.S. Cl. 18—30                                                13 Claims

ABSTRACT OF THE DISCLOSURE

An injection molding apparatus having a plurality of molding units embodying a sole mold movable from a first position defining a first molding cavity to a second position defining a second molding cavity. Mechanism is provided for bringing successive molding units into communication with a first injector and thereafter with a second injector, with the first injector introducing a molding material into the first molding cavity through a single channel in the sole mold and the second injector introducing a second molding material into the second molding cavity through the same channel. The sole mold is moved from its first to its second position during travel of the molding units from the first injector to the second injector.

---

Figure 4:
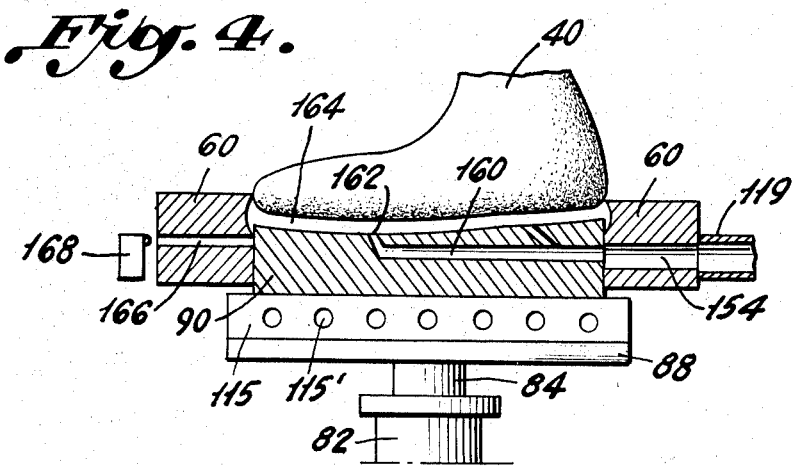

The present invention relates to an injection molding apparatus and, more particularly, to a plurality of identical but independent molding units mounted upon a rotatable work table operative to bring the molding units in turn into association with injection molding apparatus.

The molding apparatus is particularly efficacious for molding a sole by injection onto a lasted shoe upper and to provide cooling of the injection molding material on the last prior to the removal of the shoe upper therefrom. While the apparatus is primarily concerned with the injection of molding material onto a lasted shoe upper, the apparatus may also be equally successfully employed in the production of sole-heel blanks by an injection process.

In the known injection machines in which molding material is injected to form a sole onto a lasted upper, production is slowed due to the necessity of awaiting the cooling and setting of the injected molding material before the upper can be removed from the last and a new upper mounted on the last. This delay for cooling and setting is overcome by the present apparatus by the provision of a plurality of molding units mounted on a rotatable turntable whereby operators work on some molding units as injection is effected on other units and cooling achieved during the movement between the stations.

The present apparatus enables an increased production output with minimum operator time effort and allows maximum cooling time of the lasted shoe upper to reduce defects and rejects upon the molded article being removed too soon from the last and prior to complete setting of the injected shoe sole.

This apparatus is primarily designed for the production of foot-wear having layered soles, with the layers of the soles being, if desired, of various colors and/or various physical characteristics, and/or chemical properties. Generally, the apparatus comprises a rotatable table top upon which a plurality of outwardly facing, identical but independent molding units are positioned, two injection apparatus stations being located directly opposite each other and adjacent the table, and two operator stations being positioned directly opposite each other and adjacent the table and between the injector stations. One of the injection stations serves for injecting a molding material of a first color and/or physical characteristics and/or chemical composition onto a shoe upper positioned upon a last, with the other station injecting a molding material of a second color and/or physical characteristics and/or chemical composition onto the layer of the first molding material to produce a shoe or boot having a layered sole thereon.

It is the principal object of the present invention to provide an injection molding apparatus which will provide an increased production output and minimum operator time and effort.

It is a further object to provide a shoe injecting apparatus including a table upon which a plurality of identical but independent molding units are mounted, with the table being rotatable to bring the molding units successively into communication with injection molding stations.

It is also an object of the invention to provide an apparatus of the character described which will enable the injection molding of two differing molding materials, whether the materials differ in color, physical, chemical composition or characteristics.

Further objects and advantages of the invention will become more readily apparent to persons skilled in the art from the following detailed description and annexed drawings, and in which drawings:

FIG. 1 is a view partly in elevation and partly in cross-section of an apparatus embodying the invention, FIG. 2 is a top plan view of the apparatus illustrated in FIG. 1 with certain components being omitted.

Figure 5:
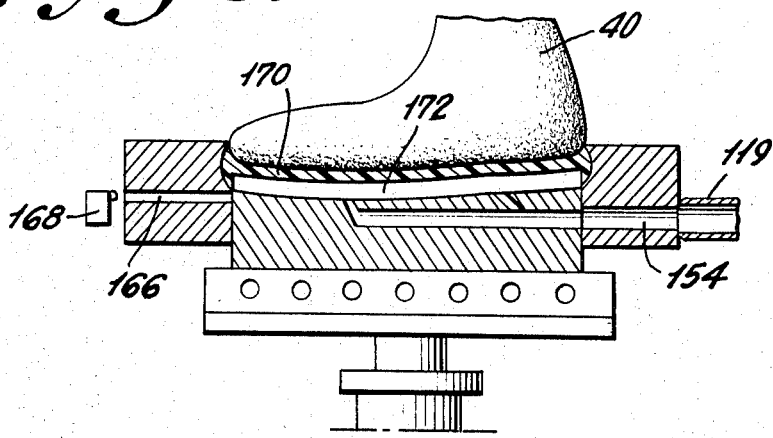
Figure 6:
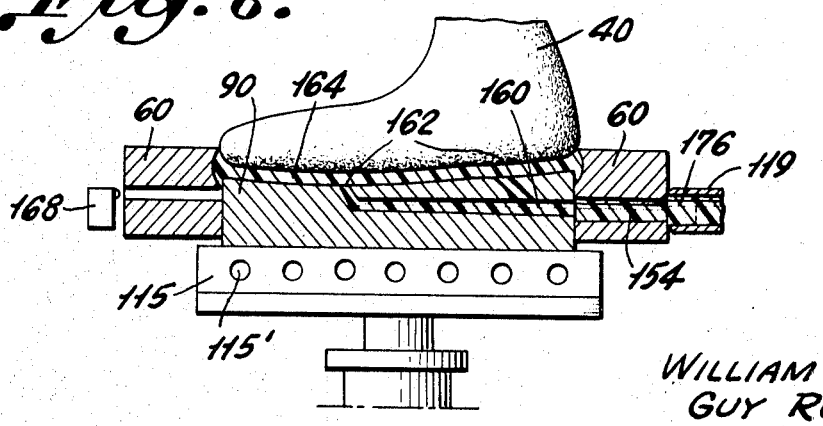

FIG. 3 is a view taken along the line 3—3 of FIG. 1, the view looking in the direction of the arrows, FIG. 4 is an enlarged sectional view of the sole mold, side molds, last and injection nozzle arrangement in FIG. 1, in their respective first positions at Station Injection 1, as shown in FIG. 2, FIG. 5 is an enlarged sectional view of the sole mold, side molds, last and injection nozzle arrangement in FIG. 1, in their second respective positions at Station Injection 2, as shown in FIG. 2, FIG. 6 is an enlarged sectional view of the side molds, sole mold, last and injection nozzle arrangement during the injection cycle at Station Injection 1 in FIG. 2, and the formation of a molding material sprue in the injection passageways of the sole mold, and the formation of a "tail" on the sprue.

Figure 7:
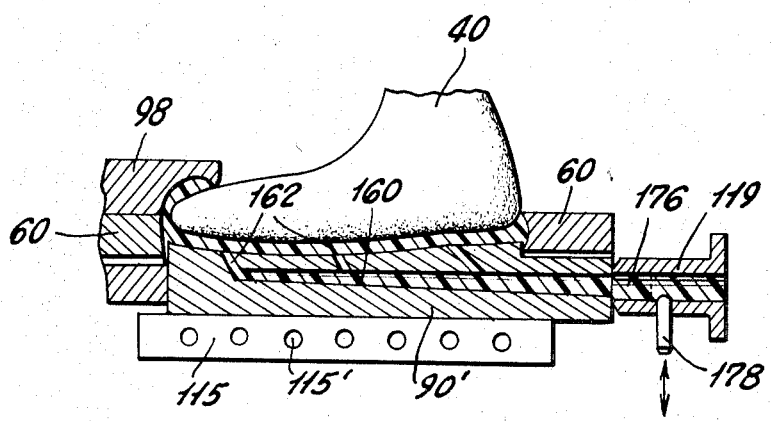
Figure 8:
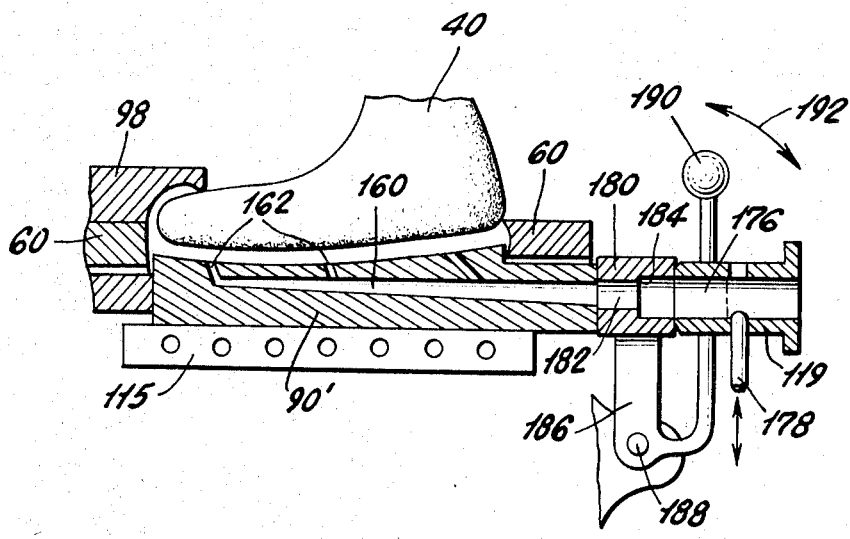

FIG. 7 is an enlarged sectional view of the formation of a sprue in a different type of sole mold, and FIG. 8 is an enlarged sectional view of a mechanical means for assisting in the removal of the sprue from the sole mold illustrated in FIG. 7.

Referring particularly to FIG. 1, the apparatus consists of a stationary base or frame member 2 upon which a rotatable table having a table top 4 and support shaft 6 are mounted. The shaft 6 is supported by bearings 8 carried by base 2 to permit rotation of the table top 4 and lower end 10 of the shaft 6 carries a gear 12. The gear 12 meshes with a gear 14 driven by a reduction gear unit and air motor 16 which, in turn, is mounted on the base 2. Manifestly, the activation of the motor gear unit 16 will rotate the gears 14 and 12 and thus rotate the shaft 6 and table top 4.

The table top 4 carries a number (four in the drawings) of identical but independent molding units denoted generally 20 placed around 360° at 90° intervals, as disclosed in FIG. 2. In FIGS. 1 and 2 only one of the molding units is shown in detail and such unit consists of upwardly projecting supporting members 22 carried by the table top 4 and which support a stationary plate 24. The outwardly facing side of the plate 24 is provided with an engaging plate 26 having slots or grooves to enable a vertical reciprocal motion to be imparted to a last carrier support member 28, as clearly shown in FIG. 3.

More specifically, the engaging plate 26 is formed with slots or grooves 30 to engage outwardly directed flanges 32 on the last carrier support member 28 so that the support member 28 can move vertically with respect to the support 24 without lateral deviation.

A last carrier 34 is rotatably carried by the support member 28 by means of a pivot pin 36, as indicated in dotted lines in FIG. 3, and manual rotation of the last carrier 34 is facilitated by the provision of handles 38. A friction lock (not shown) or other device may be provided between the last carrier support member 28 and last carrier 34 to snugly hold the carrier 34 in exact position above the work table.

The last carrier 34 supports two oppositely positioned lasts 40 which may be metal, wood or other suitable material. The lasts may be attached as at 42 to the last carrier 34 by a slot-flange arrangement similar to that between the engaging plate 26 and the last carrier support member 28. Regardless of attaching means employed, the lasts should be interchangeably attached to the last support 34 to enable lasts of varying size and/or composition to be employed.

Fixedly attached to the work table 4 by means of a flange 44 and pin 46 is a hydraulic or pneumatic cylinder 48 and piston rod 50 thereof is attached at its upper end to one end of a bellcrank lever 52 by a pin 54. The bell-crank lever 52 is secured to the support 22 by a shackle 56, while the free end of the lever 52 is attached by a pin 58 to the upper end of the last carrier support member 28. The movement of the piston rod 50 outwardly of the cylinder 48 will pivot the shackle 56 to lower the last carrier support member 28 towards work table 4 and movement of the piston rod 50 into the cylinder 48 will move the last carrier support member upwardly away from the work table.

Positioned on the work table 4 and beneath and slightly to the sides of the lowermost last 40, as best illustrated in FIG. 2, is a split mold including two side molds 60. Each side mold 60 is mounted on side mold carriers 64 which, in turn, are mounted for reciprocal horizontal movement in the directions of arrow 62. The side molds 60 are removably mounted on the carriers 64 so that molds of varying size may be employed depending upon the size of the last 40.

The horizontal reciprocal movement of the carriers 64 is controlled by hydraulic or pneumatic cylinders 66, piston rods 68 and links 70 and 72. The links 70 are pivotally affixed to the work table 4 by pins 74, and the links 72 are rotatably affixed to the carriers 64 by pins 76. Moreover, the links 70 and 72 are also pivotally connected to the cylinder 66 by pins 78, and to the piston rod 68 by pins 80. Hence, movement of the piston rod 68 in and out of the cylinder 66 will result in a reciprocal movement of the side mold carriers 64 with the resultant opening and closing of the side molds 60, respectively.

Referring again to FIG. 1, mounted beneath the work table 4 and directly beneath the last 40 and rotatable with the table is a hydraulic or pneumatic cylinder 82. An upwardly directed piston rod 84 operably associated with the cylinder 82 is axially attached to a shaft 86 which carries an elevator plate 88 upon which a sole and heel mold 90 (hereafter called sole mold) is positioned. Movement of piston rod 84 axially within the cylinder 82 results in a reciprocal vertical movement (see arrow 92) of the sole mold 90 for purposes which will be described hereinafter.

A hydraulic or pneumatic cylinder 94 is fixedly positioned on the inward side of the support 24. A downwardly projecting piston rod 96 carries a toe cap mold 98 and movement of piston rod 96 downwardly from cylinder 94 will lower the toe cap mold 98 to contact toe portion 100 of the last 40 when the last is lowered in contact with sole mold 90, as will later be more fully explained.

The motor 16 may be electric, pneumatic or hydraulic and the cylinders 48, 66, 82 and 94 may be activated by pneumatic or hydraulic pressure.

As the work table 4 rotates in a single direction (counter-clockwise in FIG. 2) during the molding procedure, pneumatic or hydraulic pressure is introduced to the cylinders via a pressure line 102 and pressure conducting seal 104 through an axial bore 106 (see broken lines in FIG. 1) provided with the shaft 6 and hence to the cylinders. The source of pneumatic or hydraulic pressure is not shown nor are the pressure lines connected to the cylinders for purpose of clarity in the drawings.

The pneumatic or hydraulic pressure conducted through bore 106 to the cylinders 48, 66, 82 and 94 is controlled by control valves 108. There are four independent cylinders associated with each of the molding units, and each unit is provided with four identical control valves 108, one for each cylinder, and one of valves 108 is shown in FIG. 1. Each of the four control valves 108 may be controlled manually by handles 110, 112, 114, 116, as disclosed in FIG. 2.

The handle 110 activates the valve 108 for controlling the pressure flow to the cylinder 82 to regulate the positioning of the sole mold 90. The handle 112 activates its corresponding valve 108 for controlling the pressure flow to the cylinder 94 to regulate the positioning of the toe cap mold 98. The handle 114 activates its corresponding valve 108 for controlling the pressure flow to the cylinders 66 to regulate the positioning of the side molds 60 and handle 116 activates its corresponding valve 108 for controlling the pressure flow to the cylinder 48 to regulate the positioning of the last 40.

While the handles 110 to 116 provide means for manual control of the pneumatic or hydraulic cylinders, the activation of the four valves 108 for each unit may be controlled automatically and in timed sequence dependent upon the rotation of the work table. This may be accomplished as disclosed in FIG. 1, by providing each of the handles 110 to 116 with links 118 which connect the handles to slide shafts 120. The shafts 120 are carried by supports 122 and are reciprocable vertically therein and the lower end of each shaft 20 is provided with a wheel 124. As the work table 4 and depending switches and shafts 120 and wheels 124 rotate, the wheels are contacted by cam surfaces 126 or studs 128 which are attached to the base 2. When a cam surface 126 contacts the wheel 124, the wheel is forced downwardly, thus lowering the handle 110. When the wheel 124 contacts the stud 128, however, the handle 110 is raised to the position shown in dotted lines in FIG. 1. Thus, it will be appreciated that the action of the cam surfaces 126 and 128 on the wheels 124 will open or close valves 108 with a resultant effect on the pneumatic or hydraulic cylinders 48, 66, 82 and 94 in automatic and timed sequence as the work table rotates and the relative positioning of the molding units changes.

As previously mentioned, the table top 4 carries four molding units 20 and in FIG. 2, the positioning of the four units is shown for clarity as Stations Operator 1, Injection 1, Operator 2, and Injection 2.

The operators of the apparatus are positioned at Stations Operator 1 and Operator 2 and the extrusion of a molding material which may be a suitably compounded plastisol composition, polyvinyl chloride mixtures, thermoplastic rubber or "dry blend" materials such as polyvinyl chloride resin powders presently available, onto a shoe or boot upper lasted on last 40 is accomplished at Stations Injection 1 and Injection 2.

Each injection apparatus is denoted generally at 111 in FIGS. 1 and 2 and includes an extruder barrel 113 provided with heating units 117, an injection nozzle 119, a hopper or reservoir 121, a motor 123 and drive chains or belts 125 for rotating a feed extruder screw (not shown)

positioned longitudinally within the barrel 113 to convey molding material through the barrel into the nozzle 119 and into a molding cavity provided within the molding units 20, as will be explained more fully later. Similar type extrusion units are described in details in U.S. Pat. No. 3,425,095.

Two injection apparatus 111 are employed to enable the injection of molding material of the same or different color, physical or chemical characteristics. It will be appreciated, however, that the use of a single injection station for the injection of a single molding composition can be employed without departing from the spirit and scope of the invention.

With further regard to the injection apparatus 111, each unit is mounted on a table 127 which, in turn, is supported by support members 129 which may be connected to the base 2. The table 127 is mounted for reciprocal horizontal movement toward and away from the molding units on the table top 4 in the direction indicated by arrow 130. This reciprocal movement is controlled by a pneumatic or hydraulic cylinder 132 securely fixed to the support 129. A leg 134 extends downwardly from the table 127 and is connected to piston rod 136 of the cylinder 132 whereby the movement of piston rod 136 relative to the cylinder 132 results in a corresponding movement of the injection barrel 113 and nozzle 119.

Depending upon the particular composition of the lasts 40, the nature and composition of the material forming the shoe upper and the molding material, it may at times be desirable to heat any or all of the lasts 40, side molds 60, sole mold 90 and toe cap mold 98 and this is accomplished most expeditiously by employing electric heating coils or elements (not shown). The current for such heating elements is supplied to the rotating molding units by employing wiper rings 138 (FIG. 1) positioned on a skirt 140. The wiper rings 138 are contacted by wiper contacts 142 provided on support blocks 144 and the current supplied to the rings 138 will flow into wiper contacts 142 and hence to the electrical heating units.

During the injection process it is found expeditious to effect a cooling of sole mold 90 and this may be accomplished by providing a cooling plate 115 having apertures or conduits 115' through which a coolant flows beneath the sole mold 90.

The operation of the present apparatus is as follows:

The operator assumes a position at Station Operator 1 and places (lasts) a shoe upper (not shown) to which a sole of molding material is to be applied onto the uppermost last 40, and rotates last carrier 34 through an angle of 180° by means of the handle 38 so that the last 40 upon which the upper is attached assumes its lowermost position above the sole mold. If the machine is on completely manual operation, the operator then in sequence trips:

(1) Handle 116 to activate the cylinder 48 to lower the last carrying supporting member 28 and depending last 40 to a predetermined position between the side molds 60.

(2) Handle 114 to activate the cylinders 66 to close the side molds 60 tightly against the sides of the shoe upper lasted on the last 40.

(3) Handle 112 to activate the cylinder 94 to lower the toe cap mold 98 onto the toe 100 of the last 40. (This step is of course necessary only when a toe cap is being employed.)

(4) Handle 110 to activate the cylinder 82 to raise the sole mold 90 to within a predetermined distance from the bottom of the last 40, leaving a cavity into which molding material is injected at Station Injection 1 between the last, sole mold and side molds.

(5) The operator then activates another switch (which may be foot operated) to activate the motor 16 and cause the table top 4 to rotate counter-clockwise 90° until the molding unit upon which the operator was working assumes the position at Station Injection 1.

The above recited sequence of steps is employed when the upper material lasted on the last 40 is a fabric. When the upper is leather, the following sequential steps are taken:

(1) The operator trips the handle 114 to activate the cylinders 66 to close the side molds 60.

(2) Handle 116 is then tripped to lower the last 40 to contact the closed side molds 60.

(3) Handle 110 is tripped to raise the sole mold 90 to within a predetermined distance from last 40 to leave a cavity between the sole mold 90, the last 40 and the side molds 60.

(4) The operator then activates another switch (which may be foot operated) to activate the motor 16 and cause the table top 4 to rotate counter-clockwise 90° until the molding unit upon which the operator was working assumes the position at Station Injection 1.

When a leather upper is used, the sequence of the closing action of the last and molds is somewhat different, and with a leather upper, the toe cap mold is not required or employed.

When the molding unit bearing the lasted upper is positioned at Station Injection 1, the operator may trip a switch to activate the cylinder 132 to advance the injecting unit 111, or the cylinder may be activated automatically in the manner described above with the valves 108 when the molding unit assumes Station Injection 1 position.

As the injection unit 111 at Station Injection 1 advances, guide 150 (see FIG. 1) engages guide slot 152 to direct the injection nozzle 119 into aperture 154 provided in the side mold carriers 64 and side mold 60 to effect communication between the nozzle 119 and the cavity defined by the last 40, sole mold 90 and side molds 60. The motor 123 which drives the feed screw within the barrel 113 is activated and the molding material which is in a molten or melted condition is conveyed through the barrel 113, nozzle 119, aperture 154 and into the molding cavity. This injection is continued either for a preselected time or until the pressure building of the molding material within the cavity reaches sufficient proportions to lower the sole mold 90 just slightly but sufficiently to trip a limit switch to stop the motor 123 and the molding material injection. This latter method of terminating the injection is fully described in the above-mentioned U.S. Pat. No. 3,425,095.

In FIG. 4 which is an enlarged view partly in side elevation and partly in cross-section of the last, the side molds and the sole mold in their initial positions prior to Station Injection 1, it will be seen that the sole mold 90 is provided with an injection canal or channel 160 and associated ports 162 leading to a cavity 164 defined between the last 40, side molds 60 and sole mold 90. Upon activation of the injection unit 111 at Station Injection 1, the molding material will be forced through the aperture 154, canal 160 and ports 162 into the cavity 164. Injection will continue either for a predetermined length of time, until there is a predetermined pressure increase in the cavity 164, or until the flow of molding material through a port 166 activates a switch 168 to stop the motor 123 and as a consequence the injection of the material.

After the injection at Station Injection 1 is completed, the cylinder 132 is again activated to move the table 127 to withdraw the injection nozzle 119 from the molding unit. Following such withdrawal of the injection nozzle 119, the table top 4 then rotates 90° in a counter-clockwise direction (rotation controlled automatically or manually) and the newly molded shoe or boot reaches position Operator 2 in FIG. 2.

During the time of travel between Station Injection 1 and Station Operator 2, the cooling effect of the plate 115 on the sole mold 90 causes the thermoplastic molding material present in aperture 154, canal 160 and ports 162 to set or solidify forming a sprue therein. One of the duties of the operator at Station Operator 2 is to remove the sprue and when this is done, the table top is indexed to rotate 90° to place the molding unit before Station Injection 2. Other duties of the operator at Station Operator 2 will be described more fully below.

After the removal of the sprue, and during the time of travel from Station Operator 2 to Station Injection 2, the cylinder 82 which controls the vertical movement of sole mold 90 is activated (either automatically or manually) to lower the sole mold 90 from the first position shown in FIG. 4 to the second position in FIG. 5. The molding material injected at Station Injection 1 has by this time set to form a sole 170 and the lowering of the sole mold 90 leaves a cavity 172 for receiving a second molding material from the injection apparatus 111. Upon arrival at Station Injection 2, the injection apparatus 111 advances, and molding material is injected into the cavity 172 via the aperture 154, canal 160 and ports 162. The injection is terminated by any of the means outlined above with reference to Station Injection 1, and following injection, the injection nozzle 119 is withdrawn and the table top indexed to return the molding unit to Station Operator 1.

The operator at Station Operator 1 then removes the sprue formed in the injection pasageways, namely, the ports 162, canal 160 and aperture 154, and toe cap mold 98 (needed only when the shoe upper is of a fabric material) is raised. The side molds 60 are opened, and the last 40 raised. The operator at Station Operator 1 then rotates the last carrier 34 by the handles 38 to rotate the last 40 carrying the freshly lasted shoe from the lowermost to the uppermost last position and the freshly lasted shoe then remains on the uppermost last until the unit rotates to Station Operator 2 where the finished product is removed.

The sequence of duties performed by the two operators and the manual or automatic control of the apparatus will now be described:

STATION OPERATOR 1

(1) The operator finishes the placing or lasting of a shoe upper on the uppermost last 40 with the shoe upper having placed there previously by the operator at Station Operator 2.

(2) The operator then removes the sprue from the injection passageway, thus clearing the passageway for subsequent injection at Station Injection 1.

(3) The side molds are opened and the last carrier is raised and rotated, and the machine advanced (automatically or under manual control) 90° to Station Injection 1 during which travel the side molds 60 close, the sole mold 90 raises and the last 40 lowers to define the cavity 164 as shown in FIG. 4.

STATION INJECTION 1

When the molding unit is properly indexed before the injection apparatus 111, the injection apparatus advances to provide communication between the nozzle 119 and aperture 154 and the motor 123 is activated to inject molding material into the cavity 164. After termination of the injection, the injection apparatus is withdrawn, and the table top is advanced 90° to position the molding unit at Station Operator 2. During this travel, the cooled sole mold 90 causes the setting of the sprue of the molding material.

STATION OPERATOR 2

(1) The operator at this station first removes the completed shoe (from a previous cycle) from the uppermost last 40, and places a new shoe upper on the uppermost last.

(2) The operator then removes the sprue of the molding material from Station Injection 1 from the injection passageway by pulling on the tail of the molding material which protrudes outwardly from aperture 154.

The turn table is then rotated 90° to Station Injection 2, and during this travel, the cylinder 82 is activated to lower the sole mold 90 to define the cavity 172 (FIG. 5) to receive molding material from Station Injection 2.

STATION INJECTION 2

As the turn table rotates 90° to index at Station Injection 2, the injection of the molding material into the cavity 172 commences, and when completed, the turn table advances to position Operator 1 during which time the sprue in the injection passageway is being set by the cooling effect of the plate 115. Upon the return of the molding unit to Operator 1, the cycle is completed, and the steps repeated in sequence.

As above explained, the activation of the switches 108 by their respective handles 110, 112, 114 and 116 to actuate the cylinders 82, 94, 66 and 48, respectively, may be accomplished by manual manipulation of the handles or by automatic tripping as by the cam surfaces 126 and cam studs 128. The activation of the motor 16 to effect rotation of the table top 4 may be accomplished manually by a push button switch (not shown) or by an automatic time control means, as may the cylinders 130 which advance and withdraw the injection units 111, and the motors 123 for effecting injection of the molding material.

All of these functions may be performed manually or automatically, or some manually and some automatically, depending upon the speed and performance of the operators.

The apparatus of the present invention is primarily concerned with the injection molding onto a fabric or leather lasted upper, of a sole consisting of two colored layers for decorative purposes, or a sole having two layers of molding material possessing different physical properties, such as resiliency and wearability. Similar type apparatus employing six stations (3 operator and 3 injection) to prepare a three layered sole is also well within the scope of the present invention.

In the production of footwear having two colored sole units, the material injected at Station Injection 1 will be of a different color than that injected at Station Injection 2. If a layered sole having a more resilient upper layer and a more durable and long wearing lower layer is desired, the resilient material is injected at Injection 1 and the more durable material injected at Injection 2.

It is also possible to produce footwear having a homogeneous sole with the present apparatus, and in which situation both injection apparatus will inject similar material.

In FIG. 6 which is a view similar to that of FIG. 4, taken immediately after injection at Injection 1, and before the injection nozzle is withdrawn from contact with the mold unit it can be seen that at this stage the cavity 164 ports 162 canal 160 aperture 154 and the aperture in nozzle 119 are completely filled with thermoplastic molding material. In view of the cooling of sole mold 90 effected by the cooling plate 115, and immediately after injection is terminated, the molding material in the ports 162 and canal 160 immediately begins to set. Also, in view of the metallic contact between the mold 90 side mold 60 and the tip of the nozzle 119 these latter two elements also experience a cooling effect and the material contained therein immediately commences to set. The molding material advancing along the extruder barrel 113 is very hot, however, and while the cooling of the tip of nozzle 119 is minimal it is sufficient to cause a "tail" 176 of material to set in the tip of the nozzle 119 so that when nozzle 119 is withdrawn the "tail" projecting outwardly from aperture 154. At Stations Operator 1 and 2, the sprue within the injection passageway may be removed by sharply pulling on the tail 176.

FIG. 7 illustrates another way of forming the tail 176 on the sprue, and, in addition to the tail formation due to the conductive cooling of the tip of the nozzle 119, the nozzle 119 is provided with a plug 178 which blocks the aperture in the nozzle 119 immediately following injection to "break" the molding material within the nozzle and assist in the setting of the tail 176 by separating the tail portion from the remaining hot molten material in the extruder barrel. The plug 178 is also useful in preventing the dripping of molten material from the nozzle tip between the injection cycles.

It will be further noted that the sole mold 90' employed is somewhat different than the sole mold 90 of the earlier figures in that the sole mold 90' contacts the nozzle 119 directly, and not through the intermediate of apertures 154 formed in the side molds 60.

FIG. 8 illustrates a type of mechanical unit for assisting in the removal of the sprue formed in the injection passages of the sole molde 90'. The unit consists of a collar 180 containing an aperture 182 having shoulders 184 and through which aperture the molding material passes. The collar 180 is supported by shaft 186 pivotally connected to the table as at 188 and provided with a handle 190.

After the injection of the molding material and the setting of the sprue in the ports 162, canal 160, aperture 182 and the setting of the sprue tail as well as the withdrawal of the injection nozzle 119 the rotation of the handle 190 (and the effect of shoulders 184 on the sprue) in the direction of arrow 192 will free the sprue from the adhesive tension within the injection passages and facilitate the further withdrawal of the sprue.

The mechanism for assisting in the removal of the sprue from the injection passageways in sole mold 90' in FIG. 8 is illustrated for manual operation. The sprue removing mechanism may, however, be automatically operated by hydraulic or pneumatic means (not shown) and which means is operable automatically upon the indexing of a molding unit at Stations Operator 1 or Operator 2. The activation of each pneumatic or hydraulic means may be accomplished by means similar to the switches 108 shown in FIG. 1.

The invention is not to be confined to any strict conformity to the showings in the drawings but changes or modifications may be made therein so long as such changes or modifications mark no material departure from the spirit and scope of the appended claims.

What is claimed is:

1. Injection molding apparatus comprising a plurality of molding units including a sole mold movable from a first position defining a first molding cavity to a second position defining a second molding cavity, and means for moving the sole mold; a first injection unit, a second injection unit and means for bringing successive molding units into communication with said first injection unit and subsequently bringing the molding units into communication with said second injection unit; said sole mold having a channel and ports provided therein through which said first injection unit injects a first molding material into said first cavity of each molding unit, and said second injection unit injects second molding material into said second cavity of each molding unit through the same channel and ports in said sole mold through which the first molding material was injected; means for removing the solidifying first molding material from said channel before said second injection unit injects the second molding material; and said means for moving said sole mold being actuated so as to move the sole mold from its first position to its second position during travel of the molding units from said first injection unit to said second injection unit.

2. The apparatus as claimed in claim 1 in which the single channel extends along the greatest linear dimension of said sole mold.

3. The apparatus as claimed in claim 1, including means for cooling said sole mold.

4. The apparatus as claimed in claim 1 in which said first injection material possesses different characteristics from said second injection material.

5. Injection molding apparatus for footwear of the type having an upper and an outsole comprising a plurality of molding units, each unit including a movable last, movable side molds and a movable sole mold having a single channel and at least two ports; means for moving said last and side molds, with said last, side, and sole molds together defining a molding cavity; means for moving said sole mold from a first position defining a first molding cavity to a second position defining a second molding cavity; a first injection unit; a second injection unit; means for bringing successive molding units into contact with said first injection unit and thereafter into contact with the second injection unit; means in said first injection unit for directly communicating with said channel and ports in the sole mold and injecting a first molding material into said first cavity of each molding unit therethrough, and means in said second injection unit for directly communicating with said channel and ports in the sole mold and injecting a second molding material into said second cavity of each molding unit therethrough; and said means for moving said sole mold being actuated to move the sole mold from its first position to its second position during travel of the molding units from said first injection unit to said second injection unit.

6. The apparatus as claimed in claim 5 in which said single channel extends along the major axis of said sole mold.

7. The apparatus as claimed in claim 6, including means for cooling said sole mold.

8. Injection molding apparatus for footwear of the type having an upper and an outsole comprising the combination of a frame; a rotatable table top mounted on said frame; means for rotating the table top; a plurality of identical but independent molding units mounted on said table top; each molding unit including a reciprocally movable last, a reciprocally movable sole mold having a single channel along the major axis of the mold and at least two ports, and reciprocally movable side molds, means to move said last and said sole and side molds to define a first molding cavity therebetween; a first injection unit mounted adjacent said table top to communicate with successive molding units as said table top rotates; and first injection means to inject a first molding material into said first molding cavity defined by the last, side molds and sole mold directly through said channel and ports; a sprue extractor to remove the solidifying first molding material sprue from said channel before further injection of molding material; a second injection unit mounted adjacent said table top to communicate with successive molding units as said table top rotates, and second injection means to inject a second molding material into a second cavity defined between the sole mold, side molds and said first molding material injected by said first injection means also directly through said channel and ports; said means for moving said sole mold of each molding unit displacing said sole mold a predetermined distance from said last during travel of the molding unit from said first injection unit to said second injection unit to form said second cavity.

9. The apparatus as claimed in claim 8, including means for cooling said sole mold, which means comprises a cooling plate having coolant passages therein.

10. The apparatus as claimed in claim 1 wherein said means for removing the solidifying first molding material comprises a pivoted collar having a stepped passage therethrough, which collar is interposed between the injection unit and said channel at least during the injection of said first molding material so that when the collar is pivoted away from said channel the stepped passage mechanically acts on the solidifying molding material to free it from said channel.

11. The apparatus as claimed in claim 5 wherein said means for removing the solidifying first molding material comprises a pivoted collar having a stepped passage therethrough, which collar is interposed between the injection unit and said channel at least during the injection of said first molding material so that when the collar is pivoted away from said channel the stepped passage mechanically acts on the solidifying molding material to free it from said channel.

12. The apparatus as claimed in claim 5, in which said first injection material possesses different characteristics from said second injection material.

13. The apparatus as claimed in claim 8 wherein said sprue extractor for removing the solidifying first molding material comprises a pivoted collar having a stepped passage therethrough, which collar is interposed between the injection unit and said channel at least during the injection of said first molding material so that when the collar is pivoted away from said channel the stepped passage mechanically acts on the solidifying molding material to free it from said channel.

References Cited

UNITED STATES PATENTS

| | | | |
|---|---|---|---|
| 3,302,243 | 2/1967 | Ludwig | 18—42(HUX) |
| 3,343,223 | 2/1967 | Ludwig | 18—42(HUX) |
| 3,363,039 | 1/1968 | Satoshi et al. | 264—245 |
| 3,463,849 | 8/1969 | Winkler | 264—245X |

FOREIGN PATENTS

| | | | |
|---|---|---|---|
| 1,489,622 | 6/1967 | France | 18—42H |

H. A. KILBY, Jr., Primary Examiner

U.S. Cl. X.R.

18—42; 264—244